C. F. PETERSON.
INSULATING MATERIAL.
APPLICATION FILED JUNE 22, 1907.
973,557. Patented Oct. 25, 1910.
Fig. 1.
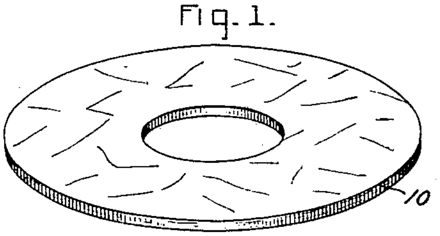
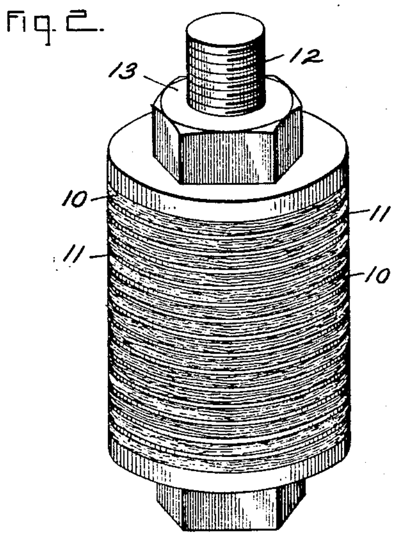
Fig. 2.
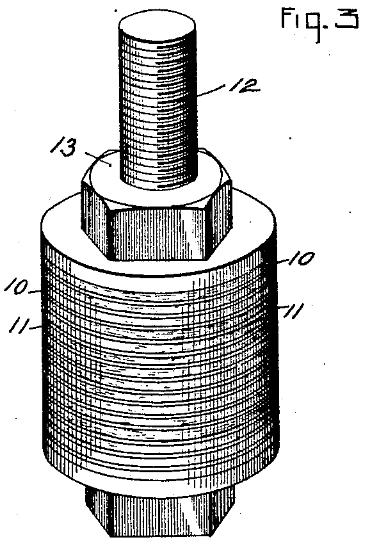
Fig. 3
WITNESSES:
W. Ray Taylor.
J. Ellis Glen.
INVENTOR:
CHARLES F. PETERSON.
by Albert G. Davis
ATTY.

16. COMPOSITIONS, COATING OR PLASTIC.

973,557 Examiner

4

UNITED STATES PATENT OFFICE.

CHARLES F. PETERSON, OF SCHENECTADY, NEW YORK, ASSIGNOR TO GENERAL ELECTRIC COMPANY, A CORPORATION OF NEW YORK.

INSULATING MATERIAL.

973,557. Specification of Letters Patent. Patented Oct. 25, 1910.

Application filed June 22, 1907. Serial No. 380,226.

*To all whom it may concern:*

Be it known that I, CHARLES F. PETERSON, a citizen of the United States, residing at Schenectady, county of Schenectady, State of New York, have invented certain new and useful Improvements in Insulating Material, of which the following is a specification.

This invention relates to insulating material and the process for forming the same, and has for its object the provision of an insulation which in addition to its insulating properties will stand a high temperature and will likewise be non-hygroscopic.

In the building up of mica fragments into insulating sheets or blocks, it has been the practice to paste the mica with shellac, varnish or the like. Insulation made in this way will burn or at least smoke at a comparatively low temperature and will likewise absorb moisture.

In carrying out my invention, I unite the mica fragments with a silicious, vitreous material which when hardened at a high temperature is fireproof and impervious to moisture. I also utilize a novel process in the carrying out of my invention. In the formation of my insulation I first build the mica fragments up into the desired form using as an adhesive a silicious compound. The particular material which I have found very desirable is composed of 2 parts of glass, 2 parts of mica, 24 parts of kaolin and 12 parts of slate, all in a finely powdered condition, to which is added 37 parts of silicate of soda and 23 parts of water. This composition may, of course, be varied as desired. When the fragments are pasted together a slight pressure is applied by means of a clamp so that the insulator may be machined or worked into the desired form. The mass is then subjected to a temperature of about 300° F. to expel the air after which it is plunged into insulating material which it readily absorbs. It is then fired at a temperature of about 400° C.

In the drawings Figure 1 is a perspective view of a complete device made according to my invention; Fig. 2 is a similar view of a number of these devices at one stage of the process; and Fig. 3 is a similar view as completed.

As shown in Fig. 2 the mica fragments are built up and united by a compound to the desired thickness. These layers 10 are separated by metallic plates or washers 11 assembled on a screw-threaded rod 12, and sufficient pressure is then applied by means of the compression nut 13 to enable the whole to be machined as shown in Fig. 2. At this stage, while still under moderate pressure, it is heated to a temperature, say about 300° F. This heating expels or rarefies the air and it is then plunged while hot into the insulating material and absorbs the same. High pressure is then applied so as to force the fragments together and compress the insulator as shown in Fig. 3, and while thus under pressure it is fired at a high temperature. I have found that a temperature of about 400° C. will accomplish my result when the materials above referred to are used. The pressure may then be removed and the mica plates will easily separate from the metallic plates and a plate or disk such as shown in Fig. 1 will be the result.

It will be seen that I have produced a hard, tough, fireproof and non-hygroscopic insulator which can be utilized for a large number of electrical purposes, which will be practically indestructible and which can be produced at a low cost.

It will be understood, of course, that various modifications of my invention will suggest themselves to those skilled in the art without departing from the spirit of my invention, the scope of which is set forth in the annexed claims.

What I claim as new and desire to secure by Letters Patent of the United States, is,—

1. An insulating material consisting of fragments of mica pasted together by a material comprising kaolin and silicate of soda.

2. An insulating material consisting of fragments of mica pasted together by a material comprising kaolin, slate and silicate of soda.

3. The process of making insulating material which consists in heating a mass of mica fragments to expel the air, plunging the mass into an insulating compound to absorb the latter, applying pressure to the resulting mass and firing the mass while under pressure.

4. The process of making insulating material which consists in building up fragments of mica into a desired form and heating it to expel the air, plunging the same into an insulating compound to absorb the Fleming. 284289, Sep. 4, 83 (Impreg. Digest)
See, 409985 Aug 27, 89 (10674)
Kimble 464367, Dec. 1, 91 " "

latter, applying pressure thereto and then firing under pressure.

5. The process of making insulating material which consists in building up fragments of mica into a desired form and heating it to expel the air, plunging the same into an insulating compound of silicious material to absorb the latter, applying pressure thereto and then firing under pressure.

6. The process of making insulating material which consists in building up fragments of mica into a desired form and heating it to expel the air, plunging the same into an insulating compound of vitreous material to absorb the latter, applying pressure thereto and then firing at a red heat under pressure.

7. The process of making insulating material which consists in building up fragments of mica into a desired form and heating it to expel the air, plunging the same into an insulating compound of kaolin and silicate of soda to absorb the latter, applying pressure thereto and then firing at a red heat under pressure.

8. The process of making insulating material which consists in building up fragments of mica into a desired form under a sufficient pressure to machine the same, heating it to expel the air, plunging the same into an insulating compound of a silicious material to absorb the latter, applying a further pressure thereto and then firing at a high heat under pressure.

In witness whereof, I have hereunto set my hand this 19th day of June, 1907.

CHARLES F. PETERSON.

Witnesses:
BENJAMIN B. HULL,
HELEN ORFORD.

Van Depoele, 353653, Nov. 30, 86 (same)
Lyman, 751664 Feb 9, 04 (same)